United States Patent
Plastina et al.

(10) Patent No.: US 7,293,227 B2
(45) Date of Patent: Nov. 6, 2007

(54) ASSOCIATING IMAGE FILES WITH MEDIA CONTENT

(75) Inventors: Daniel Plastina, Sammamish, WA (US); Michael Novak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 10/622,767

(22) Filed: Jul. 18, 2003

(65) Prior Publication Data

US 2005/0234983 A1  Oct. 20, 2005

(51) Int. Cl.
*G06N 3/00* (2006.01)
(52) U.S. Cl. .................... 715/500.1; 715/500
(58) Field of Classification Search ............... 715/500, 715/500.1; 382/100; 707/104.1
See application file for complete search history.

(56) References Cited

U.S. PATENT DOCUMENTS

| | | | |
|---|---|---|---|
| 5,793,980 A * | 8/1998 | Glaser et al. ............... 709/231 |
| 6,226,618 B1 | 5/2001 | Downs et al. |
| 6,230,207 B1 * | 5/2001 | Roberts et al. ............. 709/236 |
| 6,345,256 B1 | 2/2002 | Milsted et al. |
| 6,389,403 B1 | 5/2002 | Dorak, Jr. |
| 6,398,245 B1 | 6/2002 | Gruse et al. |
| 6,452,609 B1 * | 9/2002 | Katinsky et al. ............. 715/716 |
| 6,829,368 B2 * | 12/2004 | Meyer et al. ................ 382/100 |
| 6,973,451 B2 * | 12/2005 | Laronne et al. .............. 707/3 |
| 2001/0031066 A1 * | 10/2001 | Meyer et al. ................ 382/100 |
| 2002/0001395 A1 | 1/2002 | Davis et al. |
| 2002/0002468 A1 | 1/2002 | Spagna et al. |
| 2002/0033844 A1 | 3/2002 | Levy et al. |
| 2002/0055951 A1 * | 5/2002 | Shigetomi et al. ........ 707/501.1 |
| 2002/0059370 A1 * | 5/2002 | Shuster ....................... 709/203 |
| 2002/0069218 A1 | 6/2002 | Sull et al. |
| 2002/0082730 A1 | 6/2002 | Capps et al. |
| 2002/0099737 A1 | 7/2002 | Porter et al. |
| 2002/0103920 A1 | 8/2002 | Berkun et al. |
| 2002/0143976 A1 | 10/2002 | Barker et al. |
| 2002/0157095 A1 | 10/2002 | Masumitsu et al. |
| 2002/0184180 A1 | 12/2002 | Debique et al. |
| 2003/0036948 A1 * | 2/2003 | Woodward et al. ............ 705/10 |
| 2003/0174861 A1 * | 9/2003 | Levy et al. .................. 382/100 |
| 2004/0006575 A1 | 1/2004 | Visharam et al. |
| 2004/0172593 A1 | 9/2004 | Wong et al. |
| 2004/0175159 A1 * | 9/2004 | Oetzel et al. ................ 386/125 |
| 2004/0267693 A1 | 12/2004 | Lowe et al. |
| 2005/0091268 A1 * | 4/2005 | Meyer et al. ............ 707/103 R |
| 2005/0234958 A1 | 10/2005 | Sipustic et al. |

OTHER PUBLICATIONS

MusicMatch, MusicMatch Jukebox User's Guide, Feb. 7, 2003, Chapters A1-A6 & 1-9.*
Edward Swierk, et al., The Roma Personal Metadata Service, Mobile Networks and Applications vol. 7, pp. 407-418, 2002.

* cited by examiner

*Primary Examiner*—Stephen Hong
*Assistant Examiner*—Manglesh Patel
(74) *Attorney, Agent, or Firm*—Senniger Powers

(57) ABSTRACT

Requesting and receiving image files associated with media content. The received image files are stored such that an identifier value associated with the media content is stored in the filenames of the received image files. The invention determines which of the image files is associated with specific media content by searching for the identifier value of the specific media content in the filenames of the image files.

13 Claims, 5 Drawing Sheets

ASSOCIATING IMAGE FILES WITH MEDIA CONTENT

TECHNICAL FIELD

Embodiments of the present invention relate to the field of metadata for media content. In particular, embodiments of this invention relate to storage and association of image files with media content.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files such as Moving Picture Experts Group audio layer-3 (MP3) files and WINDOWS MEDIA technologies audio (WMA) and video files. The computer typically organizes the media files into playlists when the compressed media files are played on the computer. The files may be organized according to metadata or other property data associated with the media content. Metadata for a digital media file such as an audio file includes general information pertaining to the media file itself. This information is typically stored within the file. For example, an audio file may have metadata tags for the song title, song artist, album title, and a rating. For example, in the case of audio media files, the files may be organized by album, artist, genre, date, or some user-specified selection and ordering. A user easily navigates through this organization using menus and graphical displays to render the desired media files.

Existing systems store album art associated with media content and specified by the user in the media file. In addition, existing systems download album art from metadata providers and store the downloaded art with a generic filename (e.g., folder.jpg) in the directory storing the media file. The generic filename convention limits each file system folder or other directory storing media content to a single item of album art. When attempting to display album art for a media file, an operating system shell or the media player searches for album art stored in the media file and for album arm stored via the generic filename. However, the user may have directories of mixed music (e.g., songs from different albums in the same directory). That is, the user may store content from multiple sources in the same directory. As such, the album art with the generic filename may not be associated with every item of media content in the directory. The existing systems may display the incorrect album art or prevent the user from storing media content from multiple sources in the same directory.

Accordingly, a system for associating image files with media content is desired to address one or more of these and other disadvantages.

SUMMARY OF THE INVENTION

Embodiments of the invention associate an image file (e.g., album art) with media content by storing an identifier value associated with the media content in the filename of the image file. In an embodiment, the invention selects the image file with the identifier value in the filename and displays the selected image file (e.g., while rendering the media content with an application program such as a media player). The invention enables the user to store media content from multiple sources and image files associated therewith in the same directory.

In accordance with one aspect of the invention, a method processes a media file adapted for rendering by an application program executed by a computing device. The method includes determining whether a user-selected image file corresponding to media content contained in the media file is stored in a memory accessible by the computing device executing the application program. If the user-selected image file is not stored in the memory, the method also includes determining whether a third-party image file accessible by the computing device corresponds to the media content contained in the media file. The method includes displaying either the user-selected image file or the third-party image file as determined when the application program renders the media file corresponding thereto.

In accordance with another aspect of the invention, a method processes image files. The method includes sending, from a computing device to a metadata provider, an identifier value associated with a media file. The media file stores media content to be rendered with an application program executed by the computing device. The method also includes receiving metadata corresponding to the media content stored in the media file from the metadata provider in response to the sent identifier value. The received metadata includes an image file. The method also includes storing the received image file in a directory with the media file. The received image file has a filename. The filename includes an identifier value corresponding to the media content stored in the media file.

In accordance with still another aspect of the invention, one or more computer-readable media have computer-executable components for processing a media file in response to a user selecting media content for rendering with an application program executed by a computing device. The components include a resolution component for determining whether a user-selected image file is stored in a memory accessible by the computing device. The user-selected image file corresponds to media content stored in the media file to be rendered with the application program executed by the computing device. The resolution component further determines whether a third-party image file accessible by the computing device corresponds to the media file if the user-selected image file is not stored in the memory. The method also includes a user interface component for displaying either the user-selected image file or the third-party image file as determined by the resolution component when the application program renders the media file corresponding thereto.

In accordance with yet another aspect of the invention, a computer-readable medium stores a data structure representing a file directory accessible by a computing device. The data structure includes a media file storing media content for rendering with an application program executed by the computing device. The data structure also includes an image file corresponding to the media file. The image file has a filename associated therewith. The filename includes an identifier value associated with the media content in the media file corresponding thereto.

In accordance with another aspect of the invention, a filename for an image file associated with a media file storing media content includes an identifier value associated with the media content. An application program executed by a computing device searches a file system for the image file using the identifier value to display the image file while rendering the media content.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Media Environment

Figure 1:
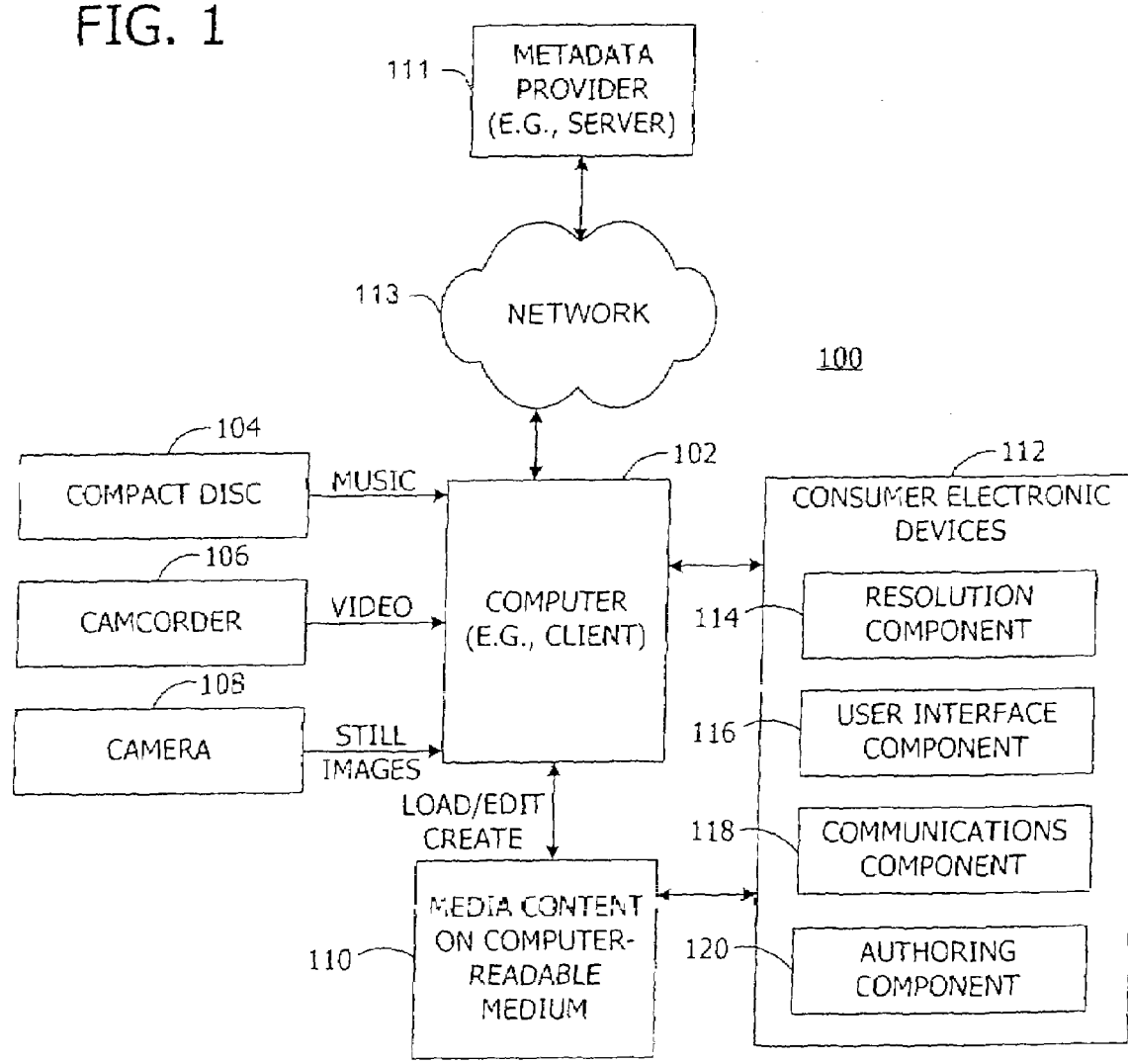
FIG. 1 is a block diagram illustrating one example of a suitable media environment in which the invention may be implemented.

Referring now to the drawings, FIG. 1 illustrates an exemplary multimedia environment in which the invention may be used. A system 100 has one or more computers 102 coupled to one or more devices providing media content (e.g., audio data, video data, and/or image data). For example, the devices may include a compact disc (CD) 104, a camcorder 106, or a camera 108. The computer 102 accesses the media content as input and can render or store the media content as a digital media file to a computer-readable medium 110.

Aspects of the invention involve associating an image file with media content contained within a media file. Each item of media content may have an identifier value associated therewith (e.g., a value for the identifier WMCollectionID). The invention permits writing the identifier value into the filename of the image file for a particular item of media content. As multiple image files may be stored elsewhere and with a different naming convention (e.g., for legacy reasons), the invention further determines the correct image file to display as described herein (see FIG. 2). For example, when attempting to display an image file associated with a particular item of media content, an operating system shell or a media player executing according to the invention searches for an image file having a filename with an identifier value embedded therein and associated with the particular item of media content.

Those skilled in the art will recognize that use of an identifier value in the filename is not merely a design choice, but has certain advantages. For example, the invention enables the user to store content from a plurality of sources in a single directory while providing an image file, stored externally to the media content in one embodiment, that is specific to each item of media content.

In one embodiment, the computer 102 stores media content on a computer-readable medium 110 for use by a media player program associated with a consumer electronic device 112. The consumer electronic device 112 includes any suitable rendering filter or media player or device that is configured to render digital media so that the user can experience the content that is embodied on the medium 110. For example, suitable media player applications include a CD media player and a DVD media player.

Media players, consumer electronic devices 112, or the like may be organized according to the capabilities of the media player. Each media player has a media type that identifies the type of media that the media player is capable of rendering. For example, the media type (also referred to as a playlist summary type, a menu summary type, or the like) includes one or more of the following: audio, video, and still image. Some media players include audio-only players such as portable CD players, car receivers, and DVD players. Other media players further include audio and still image capable players including portable and set-top DVD players optionally capable of rendering images with audio simultaneously. Other media players further include audio, still image, and video capable players. Exemplary consumer electronic devices 112 include, but are not limited to, the following: a portable CD player, a Moving Picture Experts Group audio layer-3 (MP3) player, an audio system in an automobile, a personal digital assistant, a cellular telephone, or the like.

One aspect of the present invention enables the user or, particularly, enables a media player program executing on computing device 112 or client or computer 102, to access, retrieve, and display for the user, so-called metadata. Those skilled in the art are familiar with metadata, which is simply information about data. In the context of the present invention, metadata includes information related to specific content of a digital media file being played on the media player. Basic metadata includes a title, composer, performer, genre, a description of content, and the like. Extended metadata includes cover are, performer biographies, reviews, related performers, where to buy similar items, upcoming concerts, ticket sales, network addresses (e.g., uniform resource locators) to other related experiences including purchase opportunities, and the like.

For example, the user of consumer electronic device 112 inserts a computer-readable medium that stores a digital media file into computer 102 or otherwise causes the content of the digital media file to be experienced. In the embodiment of FIG. 1, a metadata provider 111 matches metadata to the specific media content that is being experienced by the user. The metadata provider includes, but is not limited to, a local cache, a media library, a user, a local computing device, a third party art provider, or a remote server. Metadata provider 111 returns the requested metadata to computer 102. For example, if the media content includes audio data, the metadata includes an image File such as album cover art associated with the audio data.

In the examples herein, the media content of the digital media file is described in the context of content embodied on a CD or a DVD. It is to be appreciated and understood that the media content may be embodied on any suitable media, including digital Files downloaded to memory accessible by computer 102, and that the specific examples described herein are given to further understanding of the inventive principles. For convenience, a digital media file refers to one or more files representing, for example, a single song track or a collection of tracks such as would be found on an audio CD. The media content may include, without limitation, specially encoded media content in the form of an encoded media file.

In one embodiment, an exemplary consumer electronic device 112, media player, or computer 102 includes or has access to one or more computer-readable media having computer-executable components for processing a media file. The media content file is stored on a computer-readable medium such as a compact disc, a digital versatile disc, or flash memory. In one example, the metadata is available from a metadata provider 111 via a data communication network 113. The computer 102 and metadata provider 111 are coupled to the data communication network 113. While the network 113 includes the Internet in one example, the teachings of the invention may be applied to any data communication network. Further, the invention may be described in terms of computer 102 acting as a client (e.g., media player software) requesting and receiving metadata from metadata provider 111 acting as a server as shown in FIG. 1. However, it is contemplated by the inventors that the invention is operable in other network systems. That is, the invention is not limited to a client/server network system illustrated in FIG. 1. For example, the invention may be applicable in a peer-to-peer network system.

In the embodiment illustrated in FIG. 1, the components are shown to execute on consumer device 112 for simplicity. It is to be understood that any of the components may execute on the consumer device 112, computer 102, or any other computing device (e.g., remote from the user or device 112) or combination thereof. The components are further described below with reference to FIG. 2 and FIG. 3. The components include a resolution component 114, a user interface component 116, a communications component 118, and an authoring component 120. As described in greater detail herein, the resolution component 114 determines whether certain image files are stored in a memory accessible by the computing device. The image files correspond to media content stored in the media file to be rendered with the application program executed by the computing device. The user interface component 116 displays the determined image file when the application program renders the media file corresponding thereto. The communications component 118 sends an identifier value associated with the media file from the computing device to a metadata provider and receives metadata (e.g., the image file) corresponding to the media content stored in the media file from the metadata provider. The authoring component 120 stores the received image file with a filename comprising an identifier value corresponding to the media content.

Those skilled in the art will note that the invention software may be implemented with any number and organization of components or modules. That is, the invention is not limited to the specific configuration of components 114, 116, 118, and 120. Further, those skilled in the art will note that the invention may include a user interface such as the media player executing on consumer electronic device 112 or may lack a user interface (e.g., perform metadata retrieval silently in the background independent of a media player).

Image Files for Media Content

The invention permits the user to view image files in an operating system shell (e.g., in a "My Music" folder) as well as with the media player program while rendering media content. Image data associated with media content is stored in several locations. For example, image data may be stored in the file header of the media file, with a generic name in the directory storing the media file, and with a filename specific to the media file (e.g., having the identifier value). Further, a registry key may specify the image file to display for a particular item of media content (e.g., for images for customized shell folders). In addition, the image files may be stored remotely from the invention software. For example, the image files may be stored in a database associated with the metadata provider. A reference (e.g., a URL) stored in the client-side media library provides access to one or more of the stored image files.

Each item of media content has an identifier value associated therewith. The identifier value may take the form of a physical identifier such as a table of contents (TOC) for a compact disc identifying the specific digital media file based on the offsets of each track on the disc. The TOC, defined by a well-known specification referred to as the Red Book, identifies an audio CD based absolute times for the start of each track. The TOC, found in the CD's lead-in area, is expected to be the same for all like-entitled CDs published from the same source. Alternatively, the identifier value may be associated with the actual media content (e.g., a value for the identifier WMCollectionID).

The metadata provider such as metadata provider 111 has access to a database storing, in addition to other metadata, electronic album cover art associated with the specific digital media file. In response to a request from computer 012 (e.g., including the received TOC or the mapped logical ID), the metadata provider transmits one or more image files associated with the media file to computer 102. For example, exemplary files that exist in a directory with audio media content include the following: Song_A.Wma, AlbumArtSmall.jpg, Folder.jpg, AlbumArt_{52A916D1-2BF1-4E17-AC50-03BE7CF8647A}_Large.jpg, Album-Art_{52A916D1-2BF1-4E17-AC50-03BE7CF8647A}_ Small.jpg, and desktop.ini. Song_A.Wma contains the actual audio data for the song. In one embodiment, this file is for use by the operating system. AlbumArtSmall.jpg is a file created by the media player that stores a small image of album art. The last media file added to the file system by the media player has its art placed in this file in a "last writer wins" manner. As such, there can only be one such image file for a directory of content even when there is media content from more than one album in that director). Further to this example, folder.jpg is a file storing the larger version of the image and has the same behavior as AlbumArtSmall.jpg. These two art files (i.e., smaller and larger versions) are generally for use by the operating system. AlbumArt_ {52A916D1-2BF1-4E17-AC50-03BE7CF8647A}_Small. jpg and AlbumArt_{52A916D1-2BF1-4E17-AC50-03BE7CF8647A)}_Large.jpg are the image files created by the invention software. The exemplary identifier value (e.g., a collection identifier such as WMCollectionID) for this media content is 52A916D1-2BF1-4E17-AC50-03BE7CF8647A, as determined during a previous communication with the metadata provider. The naming of these files includes the WMCollectionID of the album metadata. These files are generally for use by the media player. In some instances, these image files are duplicates of AlbumArtSmall.jpg and folder.jpg.

Desktop.ini contains information for the operating system shell to use to enable a purchase experience. For example, the desktop.ini file may include the following parameters.
[.ShellClassInfo]
FolderType=MusicAlbum
MusicBuyUrl=providerName=ProviderA&albumID= 52A916D1-2BF1-4E17-AC50-03BE7CF8647A&a_id=R %20%20%20228492&album=Album %20A&artistID=

5FE0A694-4F43-4626-9976-D7B0F5F5D60A&p_id=P
%20%20%20%2023015&artist=Artist %20A&locale=4
09&version=9.0.0.2975

The initialization file (e.g., desktop.ini file) includes a network address of a related purchase opportunity (e.g., MusicBuyURL). The MusicBuyURL may represent a contractual obligation from the album art provider. In one embodiment, the MusicBuyURL may not be a full network address. For example, the MusicBuyURL in the mini file stores only the subpart of the full network address beginning with "p_id" identifier value. The MusicBuyURL may only include the parameters sent to retrieve the web page. These parameters are appended as needed to the appropriate network address to provide the information necessary to complete the network address. An operating system shell has a redirected link that it appends the parameters onto. The media player programs has its own link it appends the parameters onto. Using the redirected link allows the network address on the metadata provider to be changed to an appropriate commerce site. This mechanism also prevents someone from simply replacing the network addresses in all the .ini files (such as the desktop.ini files) to point to some other provider.

Displaying an Image File Associated with a Media File

Figure 2:
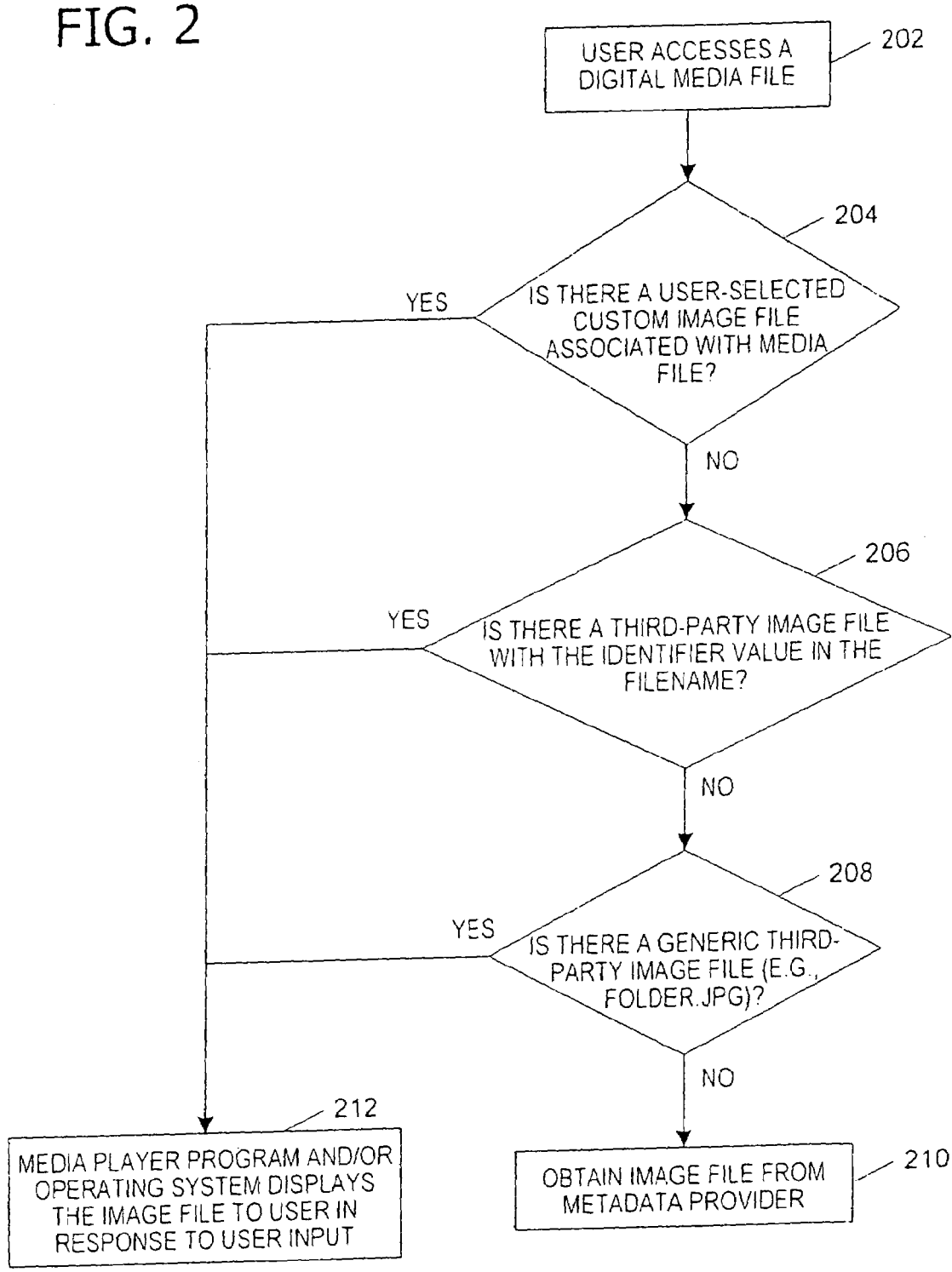
FIG. 2 is an exemplary flow chart illustrating operation of software to display image files associated with media content.

Referring next to FIG. 2, an exemplary flow chart illustrates operation of software to display image files associated with media content. The user inserts a computer-readable medium storing a digital media file into a computer or otherwise causes the content of the digital media file to be experienced at 202. The media content is stored in a media file adapted for rendering by an application program executed by a computing device. The application program includes, but is not limited to, a media player and an operating system shell. The invention software determines whether a user-selected image file corresponding to media content contained in the media file is stored in memory accessible by the computing device executing the application program at 204. The user-selected image file is stored in various locations including, but not limited to, a header of the media file, a shell folder, a registry, and a directory. For example, the invention software may examine the header of the media file to determine if a user-selected image file is available for the media file.

If the invention software determines that the user-selected file is not available, the invention determines whether a third-party image file accessible by the computing device corresponds to the media content contained in the media file at 206. For example, the invention software searches for an identifier value in a filename associated with the third-party image file. The identifier value is associated with an identifier (e.g., WMCollectionID) and corresponds to the media content. For example, the identifier value includes a globally unique identifier (GUID). In one embodiment, the third-party image file includes actual image data or a reference (e.g., a hyperlink) to image data. For example, in response to sending a request for all metadata available for an item of media content, the invention software receives return metadata which includes a network address (e.g., a URL) of a location storing art for the item of media content.

If the invention software determines that the third-party image file with the identifier value in the filename is not available, the invention determines whether a generic third-party image file (e.g., folder.jpg) has an image that is associated with the media file at 208. For example, the invention software may examine the version of the media player or search for image files with any identifier values stored in the filenames associated therewith in an attempt to determine if the generic third-party image file is associated with the media file. Alternatively, or in addition, the invention software identifies a version of the application program and determines whether the generic third-party image file corresponds to the media content contained in the media file based on the identified version. If the invention determines that the generic third-party image file does not apply to the media file, the invention software attempts to retrieve the correct image file for the media file from, for example, the metadata provider at 210.

The invention software displays either the user-selected image file or the third-party image file as determined when the application program renders the media file corresponding thereto at 212. The invention software renders the media file with an image represented by either the user-selected image file or the third-party image file as determined.

An exemplary application programming interface (API) routine implementing the flow illustrated in FIG. 2 includes LoadImage( ) which returns the proper image for a given media file as shown below:

If an image exists in the header of the file (e.g., an image customized by the user) then
  Return the image
If shell folder is customized by the user then
  Return the image
If the media content in the file has an identifier value (e.g., WMCollectionID) then
  If an image with a filename comprising the identifier value exists in the same directory as the file then
    Return the image
If a generic image file (e.g., folder.jpg) exists in the directory where the file is stored then
  If media player version is old (as specified in desktop.ini)
    Return the image
  If no image files with identifier values in the filenames exist in the same directory as the file then
    Return the image
If URLs for images exist in the media player's database, cache or library then
  Get the image file from metadata provider
  Return the image file
Return NULL if failed to find any valid image file In general, if the media player version is out-of-date or otherwise an older or previous version, then the generic image file most likely corresponds to the media content within the media file. Further, an older media player version implies that the media player has most likely not downloaded or stored any image file using the conventions described herein. If the media player version is current and image files exist with identifier values in their filenames (but not the identifier value the invention software is searching for), the invention software concludes that there is likely no image file for particular media file. The invention software either downloads the image file from the metadata provider, if available, or displays a default image.

One or more computer-readable media have computer-executable instructions for performing the method illustrated in FIG. 2.

Retrieving and Storing the Image Files

Figure 3:
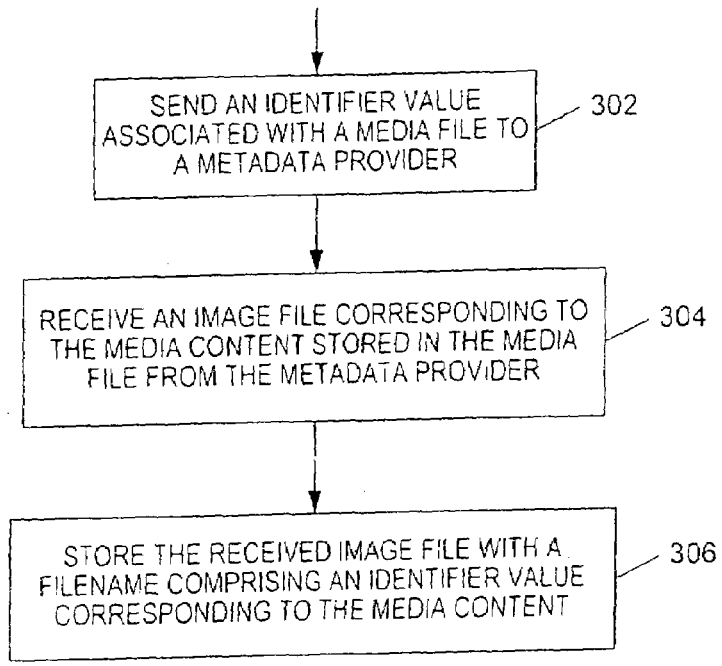
FIG. 3 is an exemplary flow chart illustrating operation of software to obtain and store image files associated with media content.

Referring next to FIG. 3, an exemplary flow chart illustrates operation of software to obtain and store image files associated with media content. The invention software, executing on a computing device, sends an identifier value associated with a media file to the metadata provider at 302. The invention software receives metadata corresponding to the media content stored in the media file from the metadata provider in response to the sent identifier value at 304. The received metadata includes an image file. The invention software stores the received image file in a directory with the media file at 306. The received image file has a filename, including an identifier value corresponding to the media content stored in the media file. The invention software overwrites an existing image file stored in the directory with the received image file as necessary. The identifier value may be received from the metadata provider or generated by the invention software. The invention software generates the filename with the identifier value. The identifier value is associated with an identifier such as WMCollectionID. For example, if a user stores a ten track album in a single directory (i.e., all tracks have the same album art), only one set of image files is stored in the directory for the tracks because all the tracks have the same WMCollectionID value (i.e., the same album art). One or more computer-readable media have computer-executable instructions for performing the method illustrated in FIG. 3.

Figure 4:
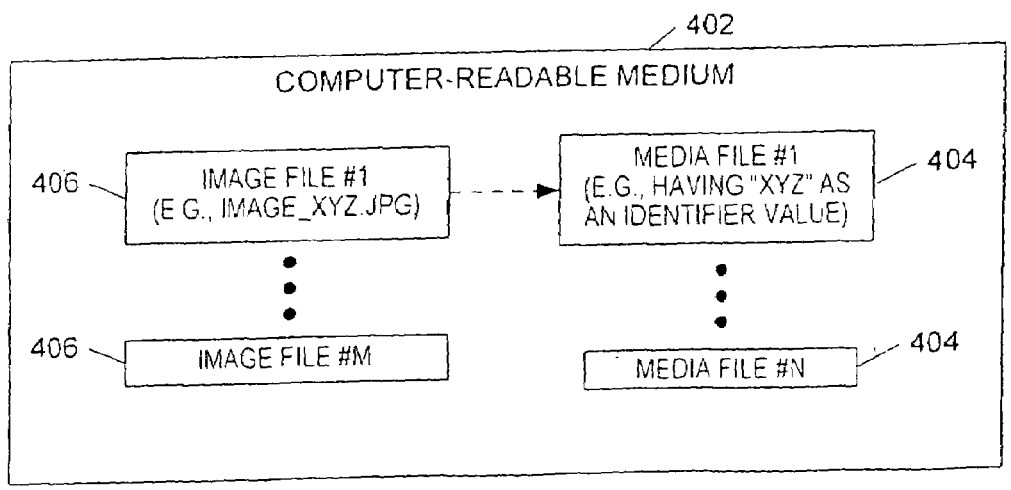
FIG. 4 is a block diagram illustrating an exemplary computer-readable medium storing media content files and image files according to the invention.

Referring next to FIG. 4, a block diagram illustrates an exemplary computer-readable medium 402 storing media files 404 with media content and image files 406 according to the invention. The computer-readable medium 402 stores a data structure representing a file directory accessible by the computing device. The data structure includes one or more media files 404 such as media file #1 through media file #N storing media content for rendering with an application program executed by the computing device. The data structure also includes one or more image files 406 such as image file #1 through image file #M corresponding to the media files 404. The image files 406 each have a filename associated therewith. The filename includes an identifier value associated with the media content in the media file 404 corresponding thereto.

A filename for one of the image files 406 associated with one of the media files 404 includes an identifier value associated with the media content. For example, the media file 404 has "XYZ" as an identifier value and the corresponding image file 406 has a filename such as "image_X-YZ.Jpg." The application program executed by the computing device searches a file system for the image file 406 using the identifier value to display the image file 406 while rendering the media content.

Exemplary Operating Environment

Figure 5:
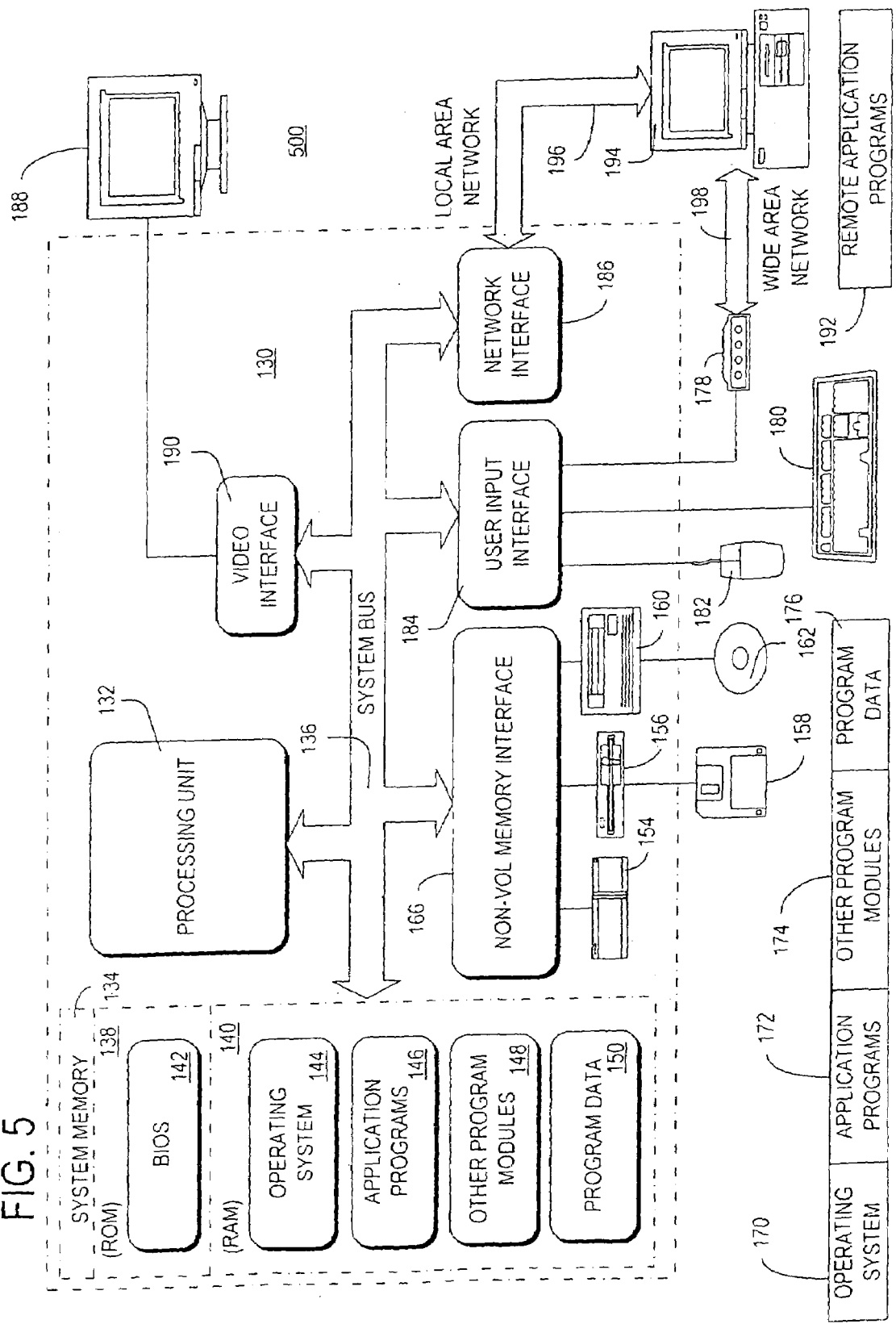
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By, way of example, and not limitation, FIG. 5 illustrates operating system 144, application programs 146, other program modules 14S, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, Which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection With an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 2 to determine whether an image file is associated with media content stored in a media file. Further, computer 130 executes computer-executable instructions such as those illustrated in FIG. 3 to request, receive, and store the image file associated with the media file such that multiple media files from different sources may be stored in the same directory and each have at least one image file associated therewith.

The computer-executable instructions may be organized into components or modules for execution by computer 130 such as illustrated in FIG. 1. For example, the resolution component 114 determines whether the user-selected image file is stored in a memory accessible by the computing device. The resolution component 114 further determines whether a third-party image file accessible by the computing device corresponds to the media file if the user-selected image file is not stored in the memory. The user interface component 116 displays either the user-selected image file or the third-party image file as determined by the resolution component 114 when the application program renders the media file corresponding thereto. The communications component 118 sends an identifier value associated with the media file from the computing device to the metadata provider. The communications component 118 receives metadata corresponding to the media content stored in the media file from the metadata provider in response to the sent identifier value. The received metadata includes the third-party image file.

Those skilled in the art will note that operation of software routines of the invention can be implemented in numerous ways all within the scope of the invention. For example, the methods illustrated in FIG. 2 and FIG. 3 may be implemented as a set of application programming interfaces (APIs) available to the media player program and to the operating system executing on computer 130. In another embodiment, the software routines described herein may be implemented as an application program executing on computer 130 that interfaces with the operating system and media player program to perform the methods illustrated in FIG. 2 and FIG. 3. In yet another embodiment, the software routines described herein may be implemented as part of the operating system executing on computer 102 with an API available to the media player.

EXAMPLES

Figure 6:
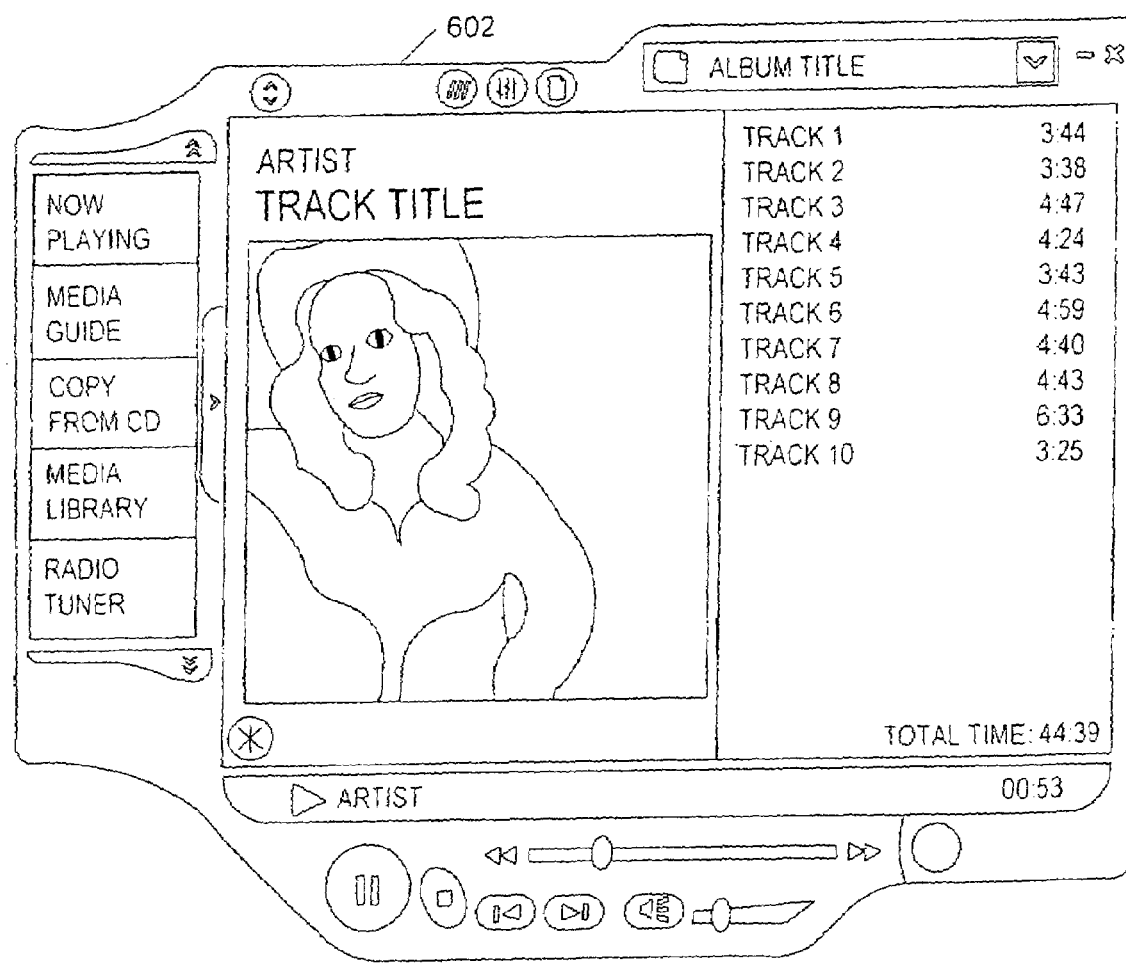
FIG. 6 is an exemplary embodiment of an album art image file displayed in a media player application program.

The media player program or operation system shell displays the album art, upon user selection, in different sizes when rendering the content of the digital media file. In one embodiment, the media player program has either a large or small "Now Playing" visualization area. These sizes correspond to the album art image file sizes downloaded from the metadata provider. Until the image files are downloaded, the media player program uses a placeholder album art picture (e.g., a default image). The album all files are stored in one embodiment with the following naming convention: AlbumArtSmall.jpg (75 pixels×75 pixels) and Folder.jpg (200 pixels×200 pixels). FIG. 6 is an exemplary embodiment of a large album art image file displayed by a media player application program 602.

In one embodiment of the invention, the operating system shell (e.g., the program that enables communication between the user and the operating system) implements a directory corresponding to the user's digital media files. For example, a "My Music" folder provides the user with easy access to his or her music files. A folder view of album art may include a side panel user interface for performing various tasks and presenting additional information. This folder permits the user to view thumbnail images of album art, play music, create CDs, search and rearrange music files, and add music to playlists directly from the "My Music" folder. Those skilled in the art recognize that using thumbnail images is more intuitive for a user because the contents or subject of the section can be easily identified as opposed to using a general icon representing the section. Viewing album art in the "My Music" folder makes it easier and more firm for the user to manage his or her music. It is to be understood that similar folders may be used for organizing and managing video and other types of digital media files.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

Unless otherwise noted, the example album titles, album cover art, song titles, artist names, companies, organizations, products, domain names, uniform resource locators, e-mail addresses, logos, people, places and events depicted herein are fictitious, and no association with any real album title, album cover art, song title, artist name, company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in limiting sense.

What is claimed is:

1. A method for processing image files, said method comprising:
   sending, from a computing device to a metadata provider, an identifier value associated with a media file, said identifier value being associated with an identifier, said identifier comprising WMCollectionID, said media file storing media content to be rendered with an application program executed by the computing device, wherein the media content comprises audio data;
   receiving metadata corresponding to the media content stored in the media file from the metadata provider in response to the sent identifier value, said received metadata including an image file; and
   storing the received image file in a directory with the media file, said received image file comprising album cover art associated with the audio data, said received image file having a filename, said filename comprising an identifier value corresponding to the media content stored in the media file, wherein storing the received image file in the directory with the media file comprises overwriting an existing image file stored in the directory with the received image file.

2. The method of claim 1, wherein the application program comprises at least one of the following:
   a media player and an operating system shell.

3. The method of claim 1, further comprising:
   receiving the identifier value from the metadata provider; and
   generating the filename with the received identifier value.

4. The method of claim 1, further comprising:
   generating the identifier value; and
   creating the filename with the generated identifier value.

5. The method of claim 1, wherein the image file comprises a reference to image data.

6. The method of claim 5, wherein the reference comprises a hyperlink.

7. The method of claim 1, wherein the identifier value comprises a globally unique identifier.

8. The method of claim 1, wherein the metadata provider comprises at least one of the following: a user, a local computing device, and a third party art provider.

9. The method of claim 1, wherein one or more computer storage media have computer-executable instructions, and further comprising executing said computer-executable instructions to perform said sending, said receiving, and said storing.

10. A computer storage medium having stored thereon a data structure representing a file directory accessible by a computing device, said data structure comprising:

a media file storing media content for rendering with an application program executed by the computing device, said media file storing audio data; and an image file corresponding to the media file, said image file storing album cover art associated with the audio data, said image file having a filename associated therewith, said filename comprising an identifier value associated with the media content in the media file corresponding thereto, wherein the application program displays the image file having the filename including the identifier value associated with the media file when the application program renders the media file, wherein said identifier value has an identifier associated therewith, said identifier comprising WM/WMCollectionID, wherein the image file is stored with the media file in the file directory by overwriting an existing image file stored in the file directory with the image file.

11. The computer storage medium of claim 10, wherein the identifier value comprises a globally unique identifier.

12. The computer storage medium of claim 10, wherein the image file comprises a reference to image data.

13. The computer storage medium of claim 12, wherein the reference comprises a hyperlink.

* * * * *